Nov. 25, 1924.
C. W. CUPPETT
1,517,196
HOSE CLAMP
Filed April 4, 1924
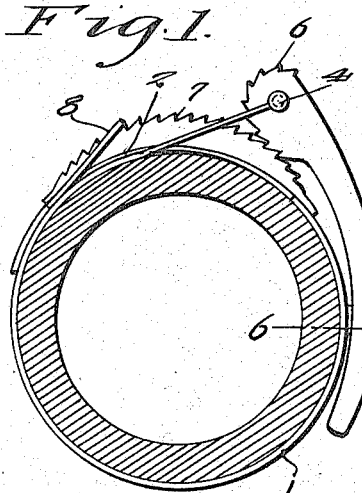
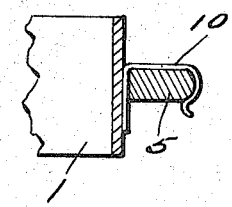
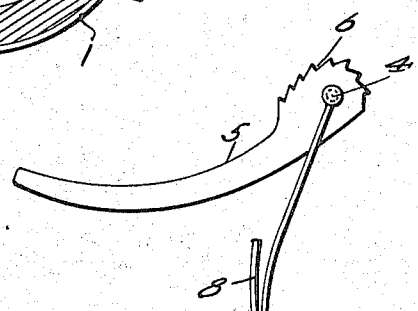
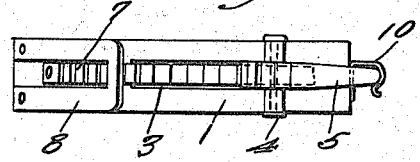
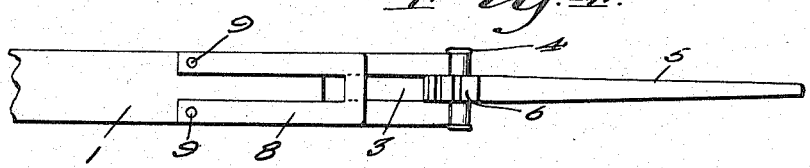
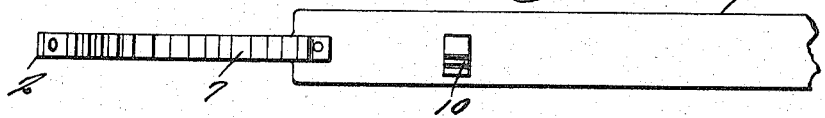

Patented Nov. 25, 1924.

1,517,196

UNITED STATES PATENT OFFICE.

CHARLES W. CUPPETT, OF MASONTOWN, PENNSYLVANIA.

HOSE CLAMP.

Application filed April 4, 1924. Serial No. 704,248.

*To all whom it may concern:*

Be it known that I, CHARLES W. CUPPETT, a citizen of the United States, residing at Masontown, in the county of Fayette and State of Pennsylvania, have invented new and useful Improvements in Hose Clamps, of which the following is a specification.

My present invention pertains to hose clamps, and it has for its general object to provide a locking and adjustable hose clamp embodying such a construction that it is adapted to fit hose of different diameters within certain limits, and is also adapted to be used to advantage without the employment of tools, screws, nuts or other extraneous devices.

To the attainment of the foregoing, the invention consists in the improvement as hereinafter described and definitely claimed.

In the accompanying drawings, forming part of this specification:—

Figure 1 is a side elevation of the clamp constituting the preferred embodiment of my invention as it appears when closed.

Figure 2 is a similar view showing the clamp in open state.

Figure 3 is a plan view of the closed clamp.

Figure 4 is an elevation of one end of the clamp.

Figure 5 is an elevation of the other end of the clamp.

Figure 6 is a detail section taken in the plane indicated by the line 6—6 of Figure 5 and showing the fastening of the clamp lever.

Similar numerals of reference designate corresponding parts in all of the views of the drawings.

Among other elements my novel clamp comprises a resilient metallic band 1. At one end the said band 1 has a reduced terminal or tongue 2, and at its opposite end the said band is bifurcated as designated by 3. The arms of the said bifurcation 3 are connected to a pin 4, and on the said pin 4 is fulcrumed a curvilinear clamp lever 5 the head of which is cam-shaped and toothed as designated by 6. Fixed on the tongue 2 of the band 1 is a toothed body 7, the toothed surface of which is convex in the direction of the length of the body 7 as illustrated. The said tongue 2 of the band 1 and the toothed body 7 carried thereby are extended through the bifurcation 3 of the band 2, as illustrated, and are also extended through a keeper loop 8 that is connected at 9 to the band 1 and is adapted to engage teeth of the body 7. The keeper loop 8 is adapted to move on the band 1 so as to carry its bight portion toward and from the band 1. In other words the said keeper loop 8 is adapted to swing toward and from the band 1.

In the practical use of my novel clamp, the same is pressed about a hose until the toothed body 7 passes through the keeper loop 8 and is engaged by said loop. The lever is then worked back and forth until the clamp is tightened sufficiently about the hose to be clamped, when the lever is pressed laterally into engagement with the lever keeper 10 on the band 1 when the lever will be securely held against casual movement. To release the clamp it is simply necessary to press the lever 5 laterally out of engagement with the keeper 10 and then swing the said lever away from the band 1 and disengage the keeper loop 1 from the body 7 when the toothed body 7 will be released and the clamp may be opened. Manifestly when the band 1 is made of resilient metal, and the toothed body 7 is released from the keeper loop 8, the resiliency of the band 1 will operate to carry the toothed body 7 out of the loop 8.

It will be apparent from the foregoing that my novel clamp may be quickly and easily fitted to and secured about hose of different sizes and that by virtue of the construction described the clamp may be strongly applied with but little effort so as to tightly clamp the hose. When the lever 5 is disengaged from the lever keeper 10, but little effort will be necessary to disengage the keeper loop 8 from the toothed body 7.

I have entered into a detailed description of the construction and relative arrangement of the parts embraced in the present and preferred embodiment of my invention in order to impart a full, clear and exact understanding of the said embodiment. I do not desire, however, to be understood as confining myself to the specific construction and relative arrangement of parts inasmuch as in the future practice of the invention various changes and modifications may be made such as fall within the scope of my invention as defined in my appended claims.

Having described my invention, what I claim and desire to secure by Letters-Patent, is:—

1. A hose clamp comprising a resilient band having a reduced tongue at one end and also having its other end portion bifurcated, a body fixed on said tongue of the band and having an outer toothed edge convex in the direction of its length and adapted to be passed through the bifurcation of the band, a keeper loop connected to the band and movable into and out of engagement with said toothed body, a lever pivoted between the arms of the bifurcation in the band and having a toothed head, and a keeper on the band and adapted to hold the lever against swinging movement away from the band.

2. A hose clamp comprising a resilient band, having a longitudinal portion with an outer toothed edge convex in the direction of its length, a keeper loop on the band to engage said toothed portion, and a lever on the band and having a toothed head to engage said toothed portion of the band.

3. A hose clamp comprising a resilient band, having a longitudinal portion with an outer toothed edge convex in the direction of its length, a keeper loop on the band to engage said toothed portion, a lever on the band and having a toothed head to engage said toothed portion of the band, and a keeper for said lever, on the band.

In testimony whereof I affix my signature.

CHARLES W. CUPPETT.